(12) United States Patent
Boudinot

(10) Patent No.: US 7,192,089 B2
(45) Date of Patent: Mar. 20, 2007

(54) AUTOMOTIVE SEAT WITH A BACKREST WHOSE POSITION CAN BE ELECTRICALLY ADJUSTED

(75) Inventor: Richard Boudinot, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 10/506,452

(22) PCT Filed: Feb. 25, 2003

(86) PCT No.: PCT/EP03/01889

§ 371 (c)(1),
(2), (4) Date: Sep. 1, 2004

(87) PCT Pub. No.: WO03/074316

PCT Pub. Date: Sep. 12, 2003

(65) Prior Publication Data
US 2005/0168035 A1    Aug. 4, 2005

(30) Foreign Application Priority Data
Mar. 5, 2002 (DE) ................ 102-09-759

(51) Int. Cl.
*B60N 2/02* (2006.01)
(52) U.S. Cl. ............... 297/362.11; 297/378.1; 297/217.3
(58) Field of Classification Search ............ 297/378.1, 297/362.11, 217.3; 296/65.16, 65.17
See application file for complete search history.

(56) References Cited

U.S. PATENT DOCUMENTS

| | | | |
|---|---|---|---|
| 3,062,584 A | 11/1962 | Galla | |
| 4,225,182 A * | 9/1980 | Werner | 297/362 |
| 4,379,539 A * | 4/1983 | Rion et al. | 248/371 |
| 4,809,180 A * | 2/1989 | Saitoh | 701/49 |
| 5,203,608 A | 4/1993 | Tame | |
| 5,269,588 A * | 12/1993 | Kunz et al. | 297/322 |
| 5,435,624 A * | 7/1995 | Bray et al. | 297/362.11 |
| 5,483,853 A * | 1/1996 | Moradell et al. | 74/665 GD |
| 5,717,300 A * | 2/1998 | Baloche et al. | 318/282 |
| 5,806,932 A | 9/1998 | Zhuang | |
| 5,918,940 A | 7/1999 | Wakamatsu et al. | |
| 6,042,145 A * | 3/2000 | Mitschelen et al. | 280/735 |
| 6,106,067 A | 8/2000 | Zhuang et al. | |
| 6,131,999 A | 10/2000 | Piekny et al. | |

(Continued)

FOREIGN PATENT DOCUMENTS

| | | |
|---|---|---|
| DE | 196 30 189 A1 | 1/1998 |
| DE | 197 37 269 A1 | 3/1999 |
| DE | 199 16 709 C1 | 2/2000 |

OTHER PUBLICATIONS

PCT International Search Report for PCT/EP03/01889, May 26, 2003 (4 pgs).

*Primary Examiner*—Milton Nelson, Jr.
(74) *Attorney, Agent, or Firm*—Foley & Lardner LLP

(57) ABSTRACT

In the case of a vehicle seat (1), in particular rear seat or rear seat bench, having a seat part (2) and having a backrest (3) which has a foldover function brought about with an electric drive, the foldover function bringing about a folding over of the backrest (3) or of a backrest part (4, 5) relative to the seat part (2), an adjustment of the inclination and the folding over are to take place in a simple and convenient manner. This is achieved by the electric drive (6) having an inclination-adjusting function, it being possible for the adjusting speed of the electric drive (6) to be changed in such a manner that a different speed can be set in each case for the inclination-adjusting function and for the foldover function.

30 Claims, 1 Drawing Sheet

U.S. PATENT DOCUMENTS

| | | |
|---|---|---|
| 6,315,361 B1 | 11/2001 | Stone et al. |
| 6,369,529 B1 * | 4/2002 | McClintock et al. ......... 318/16 |
| 6,492,786 B1 * | 12/2002 | Vang et al. .................. 318/553 |
| 2004/0195892 A1 * | 10/2004 | Daniels ................... 297/378.1 |

* cited by examiner

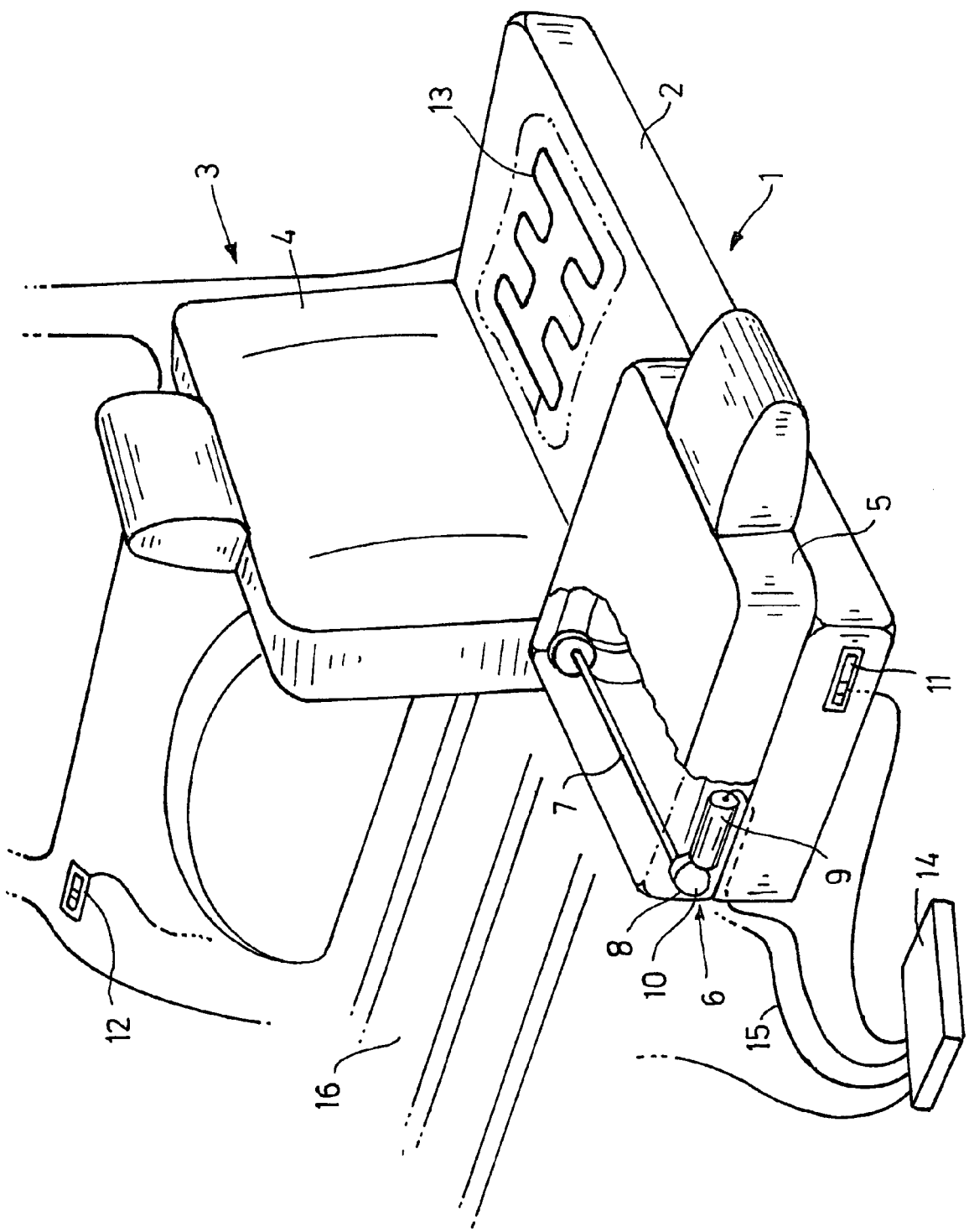

AUTOMOTIVE SEAT WITH A BACKREST WHOSE POSITION CAN BE ELECTRICALLY ADJUSTED

CROSS-REFERENCE TO RELATED PATENT APPLICATIONS

This application claims benefit to International Application No. PCT/EP03/01889, filed on Feb. 25, 2003; German Application No. 10209759.3 filed Mar. 5, 2002, both of which are incorporated herein by these references.

BACKGROUND OF THE INVENTION

The invention relates to a motor vehicle seat, in particular rear seat or rear seat bench, having a seat part and having a backrest which has a foldover function brought about with an electric drive, the foldover function bringing about a folding over of the backrest or of a backrest part relative to the seat part.

The publication OE 197 37 269 C2 discloses a motor vehicle seat, in which the inclination of the backrest can be adjusted by an electric drive in order to make different seat positions possible. This motor vehicle seat is provided with an electrically driven rotary adjusting fitting, one fitting part of which is connected fixedly to a seat-part frame and the other fitting part of which is connected fixedly to the backrest frame, it being possible for the backrest frame to be set in inclination electrically about a horizontal inclination-adjusting axis and, in addition to this, being of mechanically or manually foldable design.

Another motor vehicle seat is shown and described in the publication OE 199 16 709 C1. This motor vehicle seat, in particular rear seat or rear seat bench, is provided with a seat part and a backrest which can be folded onto the seat part which, with the backrest resting on it, can be transferred about a transverse axis arranged in its front region into an essentially upright position. This seat has automatic folding, in which the folding of the backrest and also the setting of the seat part upright and the transfer of the seat back into its operative position take place by means of cables driven by a motor-transmission unit. In this case, this seat can be operated both from the vehicle interior and from the trunk. However, this predominantly mechanical drive is complex in construction and limited in its adjusting function.

SUMMARY OF THE INVENTION

The invention is based on the object of providing a motor vehicle seat of the generic type, in which the adjustment of the inclination and the folding over can take place in a simple and convenient manner.

This object is achieved by the electric drive having an inclination-adjusting function, it being possible for the adjusting speed of the electric drive to be changed in such a manner that a different speed can be set in each case for the inclination-adjusting function and for the foldover function. Advantageous developments of the invention are contained in the subclaims.

The invention makes it possible, without a complicated mechanical construction, both to adjust the inclination of the backrest, in order to set a comfortable seat position, and also to fold the backrest over, in order to increase the volume of the trunk. According to the invention, different speeds can be set in each case, as a result of which a first speed can be assigned to the adjustment of the inclination and a second speed—deviating from the first speed—for the folding over of the backrest can be assigned to the electric drive.

Different adjusting speeds of the electric drive make it possible for the inclination-adjusting function of the backrest to advantageously be carried out at a slower speed than that of the foldover function. The slow speed has the advantage that the inclination of the backrest can be set precisely while the higher speed brings about a rapid implementation of the foldover function.

If each backrest-adjusting function, i.e. foldover and inclination-adjusting function, has a dedicated adjusting characteristic in each case, it is possible, for example, to carry out an adjustment in the foldover function at low torque and an adjustment in the inclination-adjusting function at high torque. This firstly increases the safety because, for example given a low torque in the foldover function, people cannot be injured by the small force of a pressing-down backrest, and secondly the inclination of the backrest can be set at higher torque even when subjected to a load by a person. In this case, it is not necessary to assign a slow speed to the lower torque and a higher speed to the higher torque. On the contrary, it is entirely expedient for the torque to be low given a higher speed in the foldover function, and vice versa. In this case, the changing of the torque and of the rotational speed of the motor may also be undertaken by various motor windings.

In one advantageous development of the invention, provision is made for the inclination of the backrest to be changeable in the inclination-adjusting function by the electric drive in a stepwise manner. This makes it possible for a certain position to be set more easily and conveniently in comparison to an infinitely variable adjustment—in particular with a stepping motor.

It is cost-effective if the electric drive has an electric motor which is common to both adjusting functions, it being possible, in principle, for there to be two motors, for example a first, relatively powerful stepping motor for the inclination-adjusting function and a second, smaller d.c. motor for the foldover function.

By means of an electronic or mechanical torque limitation in the foldover function, which is provided in a further advantageous refinement of the invention, in which, when an impermissible, defined value is exceeded, in the simplest case the electric drive is switched off as a consequence of measuring the motor current, people or objects are reliably protected in a simple manner from folding-over backrests. This torque limitation has proven particularly favorable if shopping bags with certain foodstuffs or other sensitive objects have been left on the rear seat and cannot be seen when the foldover function is operated from the trunk.

If the vehicle seat is provided with one or more seat occupation sensors, the safety can be additionally increased. In this embodiment, a person sitting on the rear seat is detected and the foldover function is immediately switched off automatically. It is particularly advantageous in particular if the seat occupation sensor is functionally connected to the electric drive via a control unit in such a manner that, when the seat is occupied, the foldover function is blocked and the inclination-adjusting function is not blocked. This can expediently be achieved by means of a changeover switch.

In one preferred embodiment, provision is made, in the foldover function, for the electric drive to be actuable from the passenger compartment—preferably from the particular seat—by a first operating switch, and separately from the trunk by a second operating switch, and, in the inclination-adjusting function, for it to be actuable from the particular seat. Folding over is then conveniently possible, even if the vehicle is parked between pillars in a basement garage, since the operation from the trunk can easily take place.

Convenient activation of the foldover function is possible from every position and also outside the vehicle if, according to a further advantageous refinement of the invention, provision is made for a wireless remote control which can be designed in a known manner as a radio or infrared control system. Activation may also take place by means of a speech recognition module.

It is also favorable if the electric drive is a combination of a motor and transmission. A combination of a motor and transmission—in particular in a compact construction—enables the torque to be suitably increased according to requirements or enables the speed of the rotational speed of the motor to be matched to the required driving speed.

It is also advantageous if the electric motor of the electric drive has two speeds—by changing the motor power.

The invention is explained in greater detail with reference to an exemplary embodiment in which further advantages of the invention and further features are described in greater detail.

BRIEF DESCRIPTION OF THE DRAWINGS

The single FIGURE of the drawing shows a perspective illustration of a vehicle seat.

DETAILED DESCRIPTION OF THE EXEMPLARY EMBODIMENTS

The FIGURE shows a vehicle seat 1 which is designed as a rear seat bench having a seat part 2 which is common to a plurality of backrest parts. The rear seat bench has a two-part backrest 3 on which has a first backrest part 4 and a second, smaller backrest part 5. In order to change the position of the second backrest part 5, an electric drive 6 is arranged in the vicinity of the axis of rotation 7 of the backrest 3 and on the backrest part 5, this drive being positioned in the vicinity of one end 8—preferably the outermost end in each case with respect to the backrest part—of the axis of rotation 7. The electric drive 6 comprises a motor 9 and a transmission 10, the transmission 10 being mechanically connected directly to the axis of rotation 7. The axis of rotation of the motor is situated in a space-saving manner perpendicularly with respect to the axis of rotation 7, it being possible for the motor to be controlled at two speeds.

Actuating switches 11 and 12 are provided to electrically actuate the backrest or one or more backrest parts 4, 5.

In the exemplary embodiment shown, although only one electric drive 6 for the backrest part 5 is shown, the other backrest part 4 is also provided analogously to this with a further electric drive according to the invention (not shown).

According to the invention, the electric drive 6 has two different adjusting speeds, it being possible for the adjusting speed of the electric drive 6 to be changed in such a manner that a different speed can be set in each case for an inclination-adjusting function and for a foldover function, so that both an electric adjustment of the inclination of the backrest 3 is possible, in order to set a comfortable seat position, and an electric folding over is possible, in order to increase the volume of the trunk, the trunk 16 having been enlarged, as illustrated in the FIGURE, by the backrest part 5 being folded over.

According to the invention, different speeds can therefore be set in each case, as a result of which the electric drive 6 can be assigned a first speed for the adjustment of the inclination and a second speed—deviating from the first speed—for the folding over of the backrest.

The motor 9 therefore has two speeds, a first, slow speed for adjusting the inclination of the backrest, and a second, rapid speed for folding over the backrest 3 or one or more of the backrest parts 4 and/or 5. In addition, the electric drive 6 can be provided with two adjusting characteristics, a first at high torque, for adjusting the inclination of the backrest, and a second, at low torque, for folding over the backrest.

The electric drive 6 implemented with the combination of the motor and transmission, comprising the motor 9 and the transmission 10, can be operated at two different adjusting speeds. In the inclination-adjusting function of the backrest 3 or, assumed here, of the backrest part 4, starting from a position inclined to the rear, at maximum an essentially vertical backrest position can be reached.

Starting from the position shown in the FIGURE, a rearward inclination of the backrest part 4 takes place only at a relatively slow speed in order to achieve a setting of the backrest in a manner which is as pleasant as possible. It is also readily possible for a rough setting at a somewhat more rapid speed than in a fine setting to be provided in the inclination-adjusting function. The somewhat higher speed can be set by pressing an operating switch or an operating button for a longer period, as is customary when "winding on" in CD players or when adjusting the time in digital clocks. The slow speed has the advantage of enabling the inclination of the backrest to be set precisely.

The inclination-adjusting function has an adjusting characteristic with high torque. The inclination of the backrest 3 can be set more gently and precisely at higher torque than at low torque. It is entirely expedient for the torque to be relatively high given a low speed in this function. It is then possible for a seat position which is inclined greatly to the rear to be pushed or moved forward into an upright position virtually without any effort. The torque can also be changed by switching on a further motor winding or by changing the magnetic properties of the motor 9.

An inclination of the backrest 3 in the inclination-adjusting function can be changed by the electric drive 6 in an infinitely variable manner or, in particular, in a stepwise manner, the motor 9 in the latter case being a stepping motor.

A higher adjusting speed—at least higher in comparison to one of a plurality of speeds for the backrest 3 (see above "winding on" in CD players)—can be achieved in the foldover function, the higher speed bringing about a desired, rapid implementation of the folding-over process. The foldover function is not restricted just to the tipping forward, but also comprises an automatic return of the seat back into its operative position, which corresponds to the position of the backrest part 4 in the FIGURE.

In comparison to the inclination-adjusting function, in the foldover function, in principle, only a relatively low torque is required, but is also advantageous for safety reasons. At a low torque in the foldover function, people, in particular children, cannot be injured by the low force of a pressing-down backrest. However, the movement of the backrest 3 in the foldover function has a higher speed—in contrast to that in the inclination-adjusting function—so that the trunk is enlarged as rapidly as possible.

An electronic torque limitation in the foldover function makes it possible, when an impermissible, defined value is exceeded, for the motor 9 to be switched off, the motor current being measured and a signal when there is an impermissible current being passed on to a control unit 14. However, a motor safety switch or the like may also be provided for this. Small children are thereby also protected, without additional sensors, in a simple manner from folding-over backrests. In order to additionally increase the safety, in the exemplary embodiment illustrated a plurality of seat occupation sensors are provided, only one seat occupation sensor 13 of which is illustrated. In the exemplary embodiment shown, a further seat occupation sensor is arranged in the region of the smaller backrest 5 and is also, like the seat occupation sensor 13 which is shown, integrated in the seat part 2. It is also readily possible for two seat occupation sensors to be arranged in the seat part 2 in the region of the larger backrest 3, so that there are in all three uniformly distributed seat occupation sensors, corresponding to the maximum number of people for whom a rear seat is usually provided.

In the exemplary embodiment shown, the safety is increased by a combination of torque limitation and seat occupation sensors 13, a person or more than one person sitting on the rear seat or rear seat bench being detected by one or more seat occupation sensors 13, and a rear switch 12 immediately being blocked and a front switch 11 being changed over to inclination function.

The seat occupation sensor 13 and all of the seat occupation sensors which are not shown are functionally connected to the electric drive 6 via the control unit 14, the control unit 14 being designed in such a manner that, when a seat is occupied, the foldover function is blocked and the inclination-adjusting function is not blocked. The control unit 14 is connected electrically to the operating switches 11, 12 via lines, but also to the seat occupation sensors 13 via a control line 15. The operating switches 11, 12 are described in greater detail further on. The lines may also be replaced by a bus line and do not have to be individual lines as shown in the FIGURE.

In the exemplary embodiment, the electric drive 6 for the two adjusting functions has a common electric motor 9. In principle, there can be two motors, for example a first, relatively powerful stepping motor for the inclination-adjusting function and a second, smaller d.c. motor for the foldover function.

In this case, the electric motor 9 of the electric drive 10 has two speeds by changing the voltage of the motor, one speed being provided for the folding over and the other for the inclination.

In the exemplary embodiment shown, the electric drive 6 is a combination of a motor and transmission, the transmission 10 (cf. ref. no. 8) being arranged in the vicinity of the electric motor 9 and not having any cables and cable drums or other structurally complicated means. The combination of a motor and transmission in this compact construction enables the torque to be adapted in a suitable and simple manner to the weight or the adjusting force of the backrest part 4 or 5 or to the speed of the motor 9 or to the desired driving speed.

The motor shaft of the electric motor 9 drives a toothed-wheel transmission which moves the backrest 3 or a backrest part 4 or 5 at a reduced rotational speed in comparison to the rotational speed of the motor shaft.

The transmission 10 is furthermore designed as a deflecting transmission with a 90° deflecting angle, as can be seen by the vertical arrangement of the motor with respect to the axis 7.

Although the exemplary embodiment is concerned with a rear seat, it can be transferred just as well to a front seat in order to make possible a narrow, but long trunk, in which, for example, long shelves packed in a narrow manner can be transported on the rear surface of the folded-over front passenger seat, on the rear surface of the folded-over backrest part and in the actual trunk 16 itself. The driver's seat may also be equipped with these functions in order to be able to provide a large bed, in which case all of the rear seat backs and front seat backs are then folded over. In addition to the functions with regard to the backrest, in particular the foldover function, one or more seats may be electrically displaceable and/or comprise other electric functions in order to be able to provide, for example, a sleeping surface which is as even and gap-free as possible.

The electric adjustment conveniently permits, as already indicated, considerable variation options for the vehicle interior and trunk, which satisfies the trend for versatile use of a vehicle. In particular, table top or workplace functions which are programmed in an electric control system can be realized, in which case, as already customary, the rear side of the backrest can be used as a table surface or else transporting or sleeping functions can be realized.

For the foldover function of the backrest parts 4 and 5 shown in the FIGURE, in the very simplest case there can be a switch or a changeover switch or both, and these can be used to fold over only the smaller backrest part 5 or only the larger backrest part 4 or both backrest parts 4 and 5 simultaneously. However, operation may also take place from the dashboard, in particular by means of a menu-driven touch panel or else by a menu-driven, wireless remote controls.

In principle, the electric folding over is not restricted only to folding forward, but may also comprise an electric folding rearward, which is expedient in the case of a sleeping position.

In the exemplary embodiment shown, however, only a forward folding is provided, with, in the foldover function, the electric drive 6 being actuable from the seat by a first operating switch 11 or from the trunk 16 by a second operating switch 12. In the inclination-adjusting function, only an operation from the seat, in particular from the front seat region, is possible.

In this exemplary embodiment, there are therefore a total of three operating switches for operating the rear parts 4 and 5, namely a first operating switch 11, which is arranged on the right-hand side in the seat part 2 and serves to adjust the inclination of the seat or for the folding over of the smaller backrest part 5, a second operating switch 12, which is arranged in the trunk 16 and is provided for folding over one or more backrest parts 4 and/or 5, and a third operating switch (not shown) on the left-hand side of the seat for analogously adjusting or folding over the larger backrest part 4.

The operating switches 11, 12 also have two directional functions in each case, i.e. folding forward or sitting upright or inclining forward or inclining rearward, the directional function not being required in the case of the foldover function if there are end position sensors which are connected to the control unit 14, so that, by simple pressing of one of the operating switches 11 or 12 the backrest parts 4 and/or 5, the direction of rotation of the electric motor 6 can be automatically determined and set.

A folding-over process when operated from the trunk is particularly convenient if the vehicle is parked between pillars in a basement garage or if one simply happens to be by the trunk.

A wireless remote control (not illustrated) which can be designed in a known manner as a radio or infrared control system enables the rear seat parts 4 and/or 5 to be folded over in an analogous manner from every point and also from outside the vehicle.

The vehicle seat according to the invention can be a rear seat bench with a ratio of spacing of the backrest parts of 40%–60%, 50%–50%, 100% and other values. In the exemplary embodiment shown, the backrest part 5 has, as can be seen, approximately 40% of the entire width of the backrest 3, and the backrest part 4 therefore has approximately 60%.

In this exemplary embodiment, although there is a common electric motor, there may be, in principle, as already explained, two motors, one, for example, for the inclination-adjusting function and a further one for the foldover function.

In addition, in the inclination-adjusting function various angles of inclination can be set in an infinitely variable manner, by contrast, in the exemplary embodiment shown, only two end positions are possible in the foldover function, namely a folded over backrest position (see backrest 5) and a backrest position suitable for sitting (see backrest 4), i.e. essentially upright backrest position or operative position. The unfolded end position in the operative position can either always be an essentially upright backrest position, so that the backrest always has the same starting position after a folding-over process, or it may also be a previously set position inclined more severely to the rear, so that an individually set inclination is retained after a folding-over process and does not have to be re-set. The same can be realized by means of the control unit 14.

The invention is not confined to the exemplary embodiments illustrated and described, but encompasses all of the variants of equivalent effect within the meaning of the invention. Furthermore, the invention is also not yet confined to the combination of features defined in claim 1 but can also be defined by any other desired combination of particular features of all disclosed individual features. This means that, in principle, virtually any individual feature of claim 1 can be omitted or replaced by at least one individual feature disclosed elsewhere in the application. To this extent, claim 1 is to be understood merely as a first attempt at formulating the invention.

The invention claimed is:

1. A motor vehicle seat comprising:
    a seat part (2):
    a backrest (3) and
    an electric drive (6) coupled to the seat part (2) and backrest (3), wherein the backrest (3) is moved relative to the seat part (2) in one of a fold-over function and an inclination-adjusting function by adjusting the speed of the electric drive (6) in such a manner that a different speed can be set in each case for one of the inclination-adjusting function and for the fold-over function,
    wherein the electric drive (6) has one of an electronic torque limitation and a mechanical torque limitation.

2. The motor vehicle seat as claimed in claim 1 wherein the electric drive (6) has two adjusting speeds, a higher speed being provided for the foldover function and a lower speed being provided for that of the inclination-adjusting function.

3. The motor vehicle seat as claimed in claim 1 wherein the foldover function and the inclination-adjusting function each have a dedicated adjusting characteristic.

4. The motor vehicle seat as claimed in claim 1 wherein the electric drive (6) has an electric motor (9) which is common to all of the adjusting functions.

5. The motor vehicle seat as claimed in claim 1 wherein the electric drive (6) is a combination of a motor and transmission.

6. The motor vehicle seat as claimed in claim 1 wherein the inclination of the backrest (3) can be changed in the inclination-adjusting function by the electric drive (6) in a stepwise manner.

7. The motor vehicle seat of claim 6, wherein the electric drive (6) is an electric stepping motor.

8. The motor vehicle seat of claim 1, wherein the backrest (3) includes a first backrest part (4) and a second, smaller backrest part (5).

9. The motor vehicle seat as claimed in claim 8 wherein one of the backrest (3) and backrest parts (4, 5) is folded over by wireless remote control.

10. The motor vehicle seat as claimed in claim 8 wherein the electric drive (6) is positioned proximate of one end (8) of an axis of rotation (7) and is integrated in one of the backrest (3) and the backrest part (4, 5).

11. A motor vehicle seat comprising:
    a seat part (2), wherein the seat part (2) has at least one seat occupation sensor (13);
    a backrest (3) and
    an electric drive (6) coupled to the seat part (2) and backrest (3), wherein the backrest (3) is moved relative to the seat part (2) in one of a fold-over function and an inclination-adjusting function by adjusting the speed of the electric drive (6) in such a manner that a different speed can be set in each case for one of the inclination-adjusting function and for the fold-over function;
    wherein the seat occupation sensor (13) is functionally connected to the electric drive (6) in such a manner that, when the seat is occupied, the foldover function is blocked while the inclination-adjusting function is not blocked.

12. The motor vehicle seat as claimed in claim 11 wherein the electric drive (6) has two adjusting speeds, a higher speed being provided for the foldover function and a lower speed being provided for that of the inclination-adjusting function.

13. The motor vehicle seat as claimed in claim 11 wherein the foldover function and the inclination-adjusting function each have a dedicated adjusting characteristic.

14. The motor vehicle seat as claimed in claim 11 wherein the electric drive (6) has an electric motor (9) which is common to all of the adjusting functions.

15. The motor vehicle seat as claimed in claim 11 wherein the electric drive (6) is a combination of a motor and transmission.

16. The motor vehicle seat as claimed in claim 11 wherein the inclination of the backrest (3) can be changed in the inclination-adjusting function by the electric drive (6) in a stepwise manner.

17. The motor vehicle seat of claim 16, wherein the electric drive (6) is an electric stepping motor.

18. The motor vehicle seat of claim 11 wherein the backrest (3) includes a first backrest part (4) and a second, smaller backrest part (5).

19. The motor vehicle seat as claimed in claim 18 wherein one of the backrest (3) and backrest parts (4, 5) is folded over by wireless remote control.

20. The motor vehicle seat as claimed in claim 18 wherein the electric drive (6) is positioned proximate of one end (8) of an axis of rotation (7) and is integrated in one of the backrest (3) and the backrest part (4, 5).

21. A motor vehicle seat comprising:
    a seat part (2);
    a backrest (3) and
    an electric drive (6) coupled to the seat part (2) and backrest (3), wherein the backrest (3) is moved relative to the seat part (2) in one of a fold-over function and an inclination-adjusting function by adjusting the speed of the electric drive (6) in such a manner that a different speed can be set in each case for one of the inclination-adjusting function and for the fold-over function;

wherein, in the foldover function, the electric drive (6) can be actuated from the seat and a dashboard—by a first operating switch (11), and can be actuated from a second location by a second operating switch (12) and, in the inclination-adjusting function, can be actuated from the seat.

22. The motor vehicle seat as claimed in claim 21 wherein the electric drive (6) has two adjusting speeds, a higher speed being provided for the foldover function and a lower speed being provided for that of the inclination-adjusting function.

23. The motor vehicle seat as claimed in claim 21 wherein the foldover function and the inclination-adjusting function each have a dedicated adjusting characteristic.

24. The motor vehicle seat as claimed in claim 21 wherein the electric drive (6) has an electric motor (9) which is common to all of the adjusting functions.

25. The motor vehicle seat as claimed in claim 21 wherein the electric drive (6) is a combination of a motor and transmission.

26. The motor vehicle seat as claimed in claim 21 wherein the inclination of the backrest (3) can be changed in the inclination-adjusting function by the electric drive (6) in a stepwise manner.

27. The motor vehicle seat of claim 26, wherein the electric drive (6) is an electric stepping motor.

28. The motor vehicle seat of claim 21 wherein the backrest (3) includes a first backrest part (4) and a second, smaller backrest part (5).

29. The motor vehicle seat as claimed in claim 28 wherein one of the backrest (3) and backrest parts (4, 5) is folded over by wireless remote control.

30. The motor vehicle seat as claimed in claim 28 wherein the electric drive (6) is positioned proximate of one end (8) of an axis of rotation (7) and is integrated in one of the backrest (3) and the backrest part (4, 5).

* * * * *